US005534053A

United States Patent [19]
Payne et al.

[11] Patent Number: 5,534,053
[45] Date of Patent: Jul. 9, 1996

[54] COMPOSITION FOR REDUCING OR ELIMINATING STATIC CHARGE IN ADHESIVE FILM

[75] Inventors: Charles C. Payne, Aurora; David A. Grattan, LaGrange, both of Ill.

[73] Assignee: Rodel, Inc., Newark, Del.

[21] Appl. No.: 264,289

[22] Filed: Jun. 23, 1994

Related U.S. Application Data

[63] Continuation-in-part of Ser. No. 3,524, Jan. 12, 1993, abandoned.

[51] Int. Cl.⁶ .................. C08J 3/03; C08L 93/04
[52] U.S. Cl. .................. 106/236; 106/218; 106/239
[58] Field of Search ............... 106/236, 271, 106/273.1, 278; 524/94, 210, 236, 315, 270, 271, 272, 274, 910, 911, 912, 913, 273; 252/500

[56] References Cited

U.S. PATENT DOCUMENTS

| | | | |
|---|---|---|---|
| 3,468,869 | 9/1969 | Sherburne | 524/236 |
| 3,475,867 | 11/1969 | Walsh | 156/154 |
| 3,591,563 | 7/1971 | Barie et al. | 524/236 |
| 3,630,949 | 12/1971 | Brux et al. | 106/271 |
| 4,316,757 | 2/1982 | Walsh | 156/154 |
| 5,011,937 | 4/1991 | Govindan | 524/94 |

FOREIGN PATENT DOCUMENTS

| | | | |
|---|---|---|---|
| 0694318 | 9/1964 | Canada | 524/236 |
| 0110826 | 9/1978 | Japan | 524/911 |
| 0089583 | 4/1988 | Japan | 524/272 |
| 0308478 | 12/1989 | Japan | 524/911 |

OTHER PUBLICATIONS

Encyclopedia of Chemical Technology, vol. III pp. 152–175.
Encyclopedia of Science and Engineering, 2nd Edition, pp. 100, 104, 109–111.

*Primary Examiner*—Peter A. Szekely
*Attorney, Agent, or Firm*—Panitch Schwarze Jacobs & Nadel

[57] ABSTRACT

Antistatically modified fixturing cements useful in the polishing of silicon wafers are disclosed. The fixturing adhesives disclosed generally comprise:

(a) a solvent carrier having a boiling point no greater than 200° F. under a vacuum of 25 inches of mercury;
(b) a fixturing adhesive soluble in the solvent carrier; and,
(c) an antistatic agent.

15 Claims, No Drawings

COMPOSITION FOR REDUCING OR ELIMINATING STATIC CHARGE IN ADHESIVE FILM

This Application is a continuation-in-part of application serial number 08/003,524 filed Jan. 12, 1993 now abandoned.

FIELD OF THE INVENTION

This invention relates generally to fixturing adhesives and, more particularly, to a composition and a method for reducing or eliminating static charge on adhesive films through the addition of an antistatic agent to the fixturing adhesive.

BACKGROUND OF THE INVENTION

The ubiquitous integrated chips utilized in the making of modern electronic devices are constructed from small, fragile silicon wafers. It is imperative that these wafers possess flat, blemish-free, mirror-like surfaces, since surface imperfections can adversely affect the electrical properties of the final integrated chips.

Typically, substrate wafers are cut by diamond-sawing single crystal silicon rods. In order to ensure integrated chips of sound structural integrity, it is first necessary to remove the toughened portion of the crystal surface which was produced during the sawing procedure.

The first operation for obtaining a blemish-free surface is called "lapping". The lapping operation employs a coarse abrasive such as coarse alumina or silicon carbide abrasive particles. Lapping removes coarse surface imperfections from the sawing operation. Lapping also provides flatness and parallelism to the surface.

After the lapping operation, a series of polishing steps are employed to eliminate the remaining surface imperfections.

During the polishing operation, a number of silicon wafers are typically mounted or "fixtured" onto a metal or ceramic carrier or polishing head by a template assembly or by an adhesive material, in order to eliminate the need for manually polishing each individual wafer. The template assembly consists of impregnated polyurethane and plastic retaining rings to hold the silicon wafers in place. Adhesive materials may be a wax or a rosin dissolved in a chlorinated hydrocarbon solvent.

Unfortunately, certain difficulties arise in the fixturing procedure, whether the silicon wafers are attached by a template assembly or mounted using an adhesive material. For example, when the silicon wafers are attached onto the metal or ceramic carrier or polishing head by a template assembly, the polyurethane layer compresses, thereby allowing the wafer to move as it is being polished. This movement can result in uneven polishing, rounded edges and a loss of flatness.

Alternatively, when the adhesive mounting method of silicon wafers is employed, air bubbles can become entrapped in the adhesive layer. If the surface of the wafer comes into contact with the sticky adhesive layer soon after it is applied to the carrier or polishing head and before all of the air is forced out from beneath the wafer, some air bubbles remain trapped between the wafer and surface of the carrier or polishing head. The desired flatness of the silicon wafer surface cannot be achieved when such air bubbles are entrapped and allowed to remain during polishing.

Today, with the advent of very large scale integration (VLSI) chips, it has become more critical than ever to achieve an extremely flat surface. The especially flat blemish-free surfaces requiring the multiple layers of circuitry found in VLSI chips cannot be achieved if air bubbles are trapped below the wafer in the fixturing step or if the silicon wafer is able to move as it is being polished.

It has been suggested that these problems can be reduced or eliminated by spin coating an adhesive film onto a metal or ceramic carrier. U.S. Pat. No. 3,475,867 to Robert J. Walsh discloses the application of an adhesive wax solution onto a rotating carrier plate. The plate is rotated at a sufficient speed to cause the wax to spread out uniformly over the entire surface of the carrier plate. The wax is then heated, yielding a tacky surface to which the wafers are applied.

Alternatively, U.S. Pat. No. 4,316,757 to Robert J. Walsh discloses the application of a wax solution onto a highly machined alumina carrier followed by spinning to spread the coating. The carrier is subsequently heated from below to cure the adhesive and drive off the solvent. When the adhesive becomes tacky, the silicon wafer is mounted under vacuum to prevent the entrapment of air bubbles. Once the carrier is cooled and polished, the wafers are demounted and cleaned.

Unfortunately, both of the above methods give rise to the formation of static charge during the spinning step.

A charged stainless steel or mild steel ring may be used to dissipate the static charges which develop on the surface of the metal or ceramic carriers. However, current must be supplied to the ring in this process, making this a costly solution. Furthermore, additional static charges may still be induced into the adhesive coating. Unless the environment is extremely clean, dirt particles from the air will be attracted and absorbed into the charged adhesive film. The adhesive film will deform around the particulate matter, thereby causing imperfections or "dimples" on the polished surface of the wafer. The resulting defects and non-uniform wafer surface can disrupt electronic flow and cause electrical problems. Moreover, induced charge on the wafer may attract oppositely charged undesirable dust or dopant particles.

In addition to the above requirements, fixturing adhesives should not contain materials which even in small quantities would act as semi-conductor dopants. Materials containing boron, phosphorous and metals should be avoided.

Solvents utilized in the manufacture of antistat adhesives should have a high enough flash point to readily evaporate under vacuum with only minimal heating and should not cause unwanted flow patterns of the adhesive during drying. Unwanted flow patterns of the adhesive/solvent mixture can cause pooling at some locations, and solvent depletion in others. This forming of uneven surfaces is called "bumps" and "sinks" defects.

Therefore, it would be highly desirable to develop a practical, economically attractive method for reducing or eliminating static charge on fixturing adhesive films, to prevent the attraction of airborne particulates to the adhesive film and wafer surfaces, thereby maintaining the quality of the adhesive film coating and the subsequent quality of any polished wafers mounted during polishing with this fixturing adhesive.

SUMMARY OF THE INVENTION

This invention entails a method for reducing or eliminating static charge on fixturing adhesive films and silicon wafers so treated by adding an antistatic agent to the fixturing adhesive. The reduction or elimination of static charge effectively inhibits the attraction of particulate contaminants, thereby maintaining the quality of the adhesive film coating and the subsequent quality of any polished wafers attached with this adhesive. Furthermore, the present invention is economically appealing since static charges are dissipated without the need to supply current during fixturing operations.

DETAILED DESCRIPTION OF THE INVENTION

A general description of the methods used to mount semi-conductor slices on a carrier for further processing is contained in U.S. Pat. No. 3,475,867 to Walsh, which is hereinafter incorporated by reference into this specification.

The basic method generally employed in the use of adhesive materials of this invention calls for the application of the adhesive mixture to a carrier which is then spun. The spinning produces a uniformly distributed film 10–20 microns in thickness and the resultant film is then dried from the bottom using steam. While still hot from the application of steam, the carrier is generally placed into a vacuum chamber and the wafers are then mounted under vacuum into the carrier. After wafer placement, the carrier is removed from the vacuum chamber, flipped over, and cooled with water. The adhesive holding the wafer onto the carrier must be water resistant, and not water soluble. Likewise, the adhesive must be chemically and mechanically strippable and offer some flexibility during the actual wafer polishing step. Generally, rosin itself is too brittle so that a plasticizer or solvent is added to provide some plasticity while the polishing occurs at a temperature above the glass transition temperature of the adhesive material. While above the glass transition temperature, it is important that the solvent adhesive mixture remain relatively tacky. Stock polishing is generally conducted at a temperature of from 45° C.–60° C., while fine polishing is generally conducted at ambient temperature.

In the practice of the present invention, a fixturing adhesive is dissolved in a solvent carrier. The combination of the fixturing adhesive and solvent should provide a material capable of providing "delayed tack". Delayed tack may be defined as any substance which is essentially non-tacky at room temperature but which softens and becomes tacky at a given elevated temperature. Polymeric substances exhibiting delayed tack include rosin-based materials, shellacs, rubbers, asphaltenes or tars, waxes, polyethylenes, polyproplenes, polyamides and polyesters.

The preferred fixturing adhesive in the practice of the present invention is a rosin-based material. The preferred rosin-based materials include the following products of Hercules Incorporated of Wilmington, Del. Pentalyn C, which is a penta-erythritol ester of wood rosin, Pentalyn H, which is a penta-erythritol ester of a hydrogenated wood rosin, and Staybelite Ester 10, which is a glycerol ester of a partially hydrogenated wood rosin.

Any solvent with appropriate curing characteristics may be used as the carrier. Curing is defined as removal of the solvent after application of the fixturing adhesive solution, leveling of the solvent-free surface film to form a uniformly thick coating, and softening of the adhesive solids above the glass transition or softening temperature to the point that sufficient tack is developed to tightly adhere the silicon wafer to the carrier. Preferred solvents are organic esters with carbon chain lengths of from 4 to 8 carbon atoms. These materials are preferred because they cure quickly to form uniformly thick coatings.

Among the carriers which may be utilized for the fixturing adhesives of this invention include $C_6$–$C_2$ aliphatics. Aromatics, such as benzene, toluene, and xylene; ketones, such as methylisobutyl ketone; alcohols, such as $C_5$–$C_{20}$, straight chain and branched alcohols; chlorinated hydrocarbons, and the like. Preferred carriers for use in this invention are aliphatic esters containing 4–8 carbon atoms. A particularly preferred material is hexyl acetate, although ethyl acetate is also a preferred material. The boiling points of the carriers may vary substantially. In the manufacture of silicon wafers, it is common to dry the fixturing adhesive under vacuum so as to avoid prolonged heating of the silicon wafer material. As such, materials having boiling points as high as 400° F. may be utilized so long as suitable solvent evaporation occurs at a temperature no higher than 200° F. under a vacuum as high as 25 inches of mercury. It should be pointed out the during this process it is not necessary to remove all of the solvent and generally, 0–10 and most preferably, 0–5% of the solvent remains in the fixturing adhesive material after drying.

The boiling point of the solvent carrier should be selected so that the carrier will substantially evaporate from a thin film of the adhesive at the boiling point of water (steam heat provided to the wafer polishing process) under a vacuum of 25 inches of mercury in about 60 seconds.

One of the preferred ester carriers for use with the preferred fixturing adhesive resins of this invention is hexyl acetate. Hexyl acetate has good wetting characteristics with respect to the carrier surface and is generally free of localized solvent flows, which would produce a non-uniform thick coating during the drying and curing processes.

Another ester which may be used is ethyl acetate. This solvent performs generally as well as hexyl acetate in preparing uniform adhesive films. The drawback in the use of ethyl acetate is the fact that this solvent is highly flammable and therefore systems employing ethyl acetate require explosion-proof equipment.

When the fixturing adhesive being used is a rosin-based material, the dissolution parameters will depend upon the chain-length of the ester and the type of rosin being used. Shorter chain-length esters will dissolve all of the above-suggested rosins faster and at lower temperatures than longer chain-length esters. Also, faster dissolution can be accomplished by heating, preferably in a closed reactor to prevent solvent loss and minimize the danger of explosion.

When rosin-based materials are used, they should be present in the ester carrier at a level ranging from about 20 to 60% by weight, and preferably, in the range of about 20 to 30% by weight.

In accordance with this invention, an antistatic agent is added to the fixturing adhesive, preferably after dissolution of the rosin or other fixturing adhesive. The antistatic agent should be sufficiently soluble in the rosin solution (or other adhesive) to ensure that a continuous adhesive film is produced on the surface of a substrate.

Among the antistatic compounds that can be used in the antistat mounting adhesive formulations of this invention are those fat-based nitrogen-containing compounds containing 6–30 carbon atoms. Among the preferred materials include:

| Primary Fatty Amines | Secondary Fatty Amines |
| --- | --- |
| Coco amine | Secondary lauryl amine |
| Tallow amine | Secondary stearyl amine |
| Oleyl amine | Secondary oleyl-linoleyl amine |
| Oleyl-linoleyl amine | |
| Myristyl amine | |
| Tertiary Fatty Amines | Quaternary Fatty Amines |
| Tricaprylyl amine | Trimethyl stearyl ammonium chloride |
| Trilauryl amine | Trimethyl lauryl ammonium chloride |
| Tricoco amine | Trimethyl oleyl ammonium chloride |
| Difatty Dimethyl Quaternary Amines | Trifatty Methyl Quaternary Amines |
| Dilauryl dimethyl ammonium chloride | Tricaprylyl methyl ammonium chloride |
| Distearyl dimethyl ammonium chloride | |
| Di(oleyl-linoleyl)dimethyl ammonium chloride | |
| Dihydrogenated tallow dimethyl ammonium chloride | |
| Quaternized Fatty Diamines | Fatty Amine Acetates |
| Quaternized coco diamine | Hydrogenated tallow amine acetate |
| Quaternized tallow diamine | Primary stearyl amine acetate |
| | Primary tallow amine acetate |
| Fatty Amine Hydrochlorides | Amides |
| Primary stearyl amine hydrochloride | Octanamide |
| Primary tallow amine hydrochloride | Dodecanamide |
| | Octadecanamide |
| | 9-Octadecenamide |
| Imidazolines | Other Heterocyclics |
| Oleyl imidazoline | Morpholine |
| Coco imidazoline | Piperazine |
| Capryl imidazoline | |

Materials that should not be used as antistatic agents include:

1. Inorganic metal salts containing sodium or potassium.
2. Any organometallic compound.
3. Any semi-conductor dopant material including, but not limited to, Group IIIA elements, including boron, aluminum, gallium, and indium and Group VA elements, phosphorus, arsenic and antimony.

The antistatic agent should be present in the fixturing adhesive at a level ranging from about 1 to 10% by weight, based on the weight of the product, and preferably in the range of about 3 to 5% by weight.

A plasticizer may be added to the fixturing adhesive to enhance strength properties. Plasticizers improve tensile strengths in fixturing adhesives by reducing or eliminating the brittle nature of the mounting materials. The resulting mixture, when stressed, undergoes ductile fractures, i.e., the adhesive bonds can elongate before total fracture occurs. This enhanced elongation in the adhesive bonds manifests itself as improved tensile strength. Polyethylene glycol, polypropylene glycol, and polyhydric compounds such as ethylene glycol or glycerine may used as the plasticizer. Polyethylene glycol is preferred. The plasticizer may be present in the fixturing adhesive at a level ranging from about 0 to 5% by weight, depending upon the adhesive strength requirements.

Other additives may also be employed in the adhesive mixtures of this invention. Examples include dyes which can be used for visible identification of wafers, bactericides so as to prevent biodegradation of the adhesive mixture, and the like.

EXAMPLES

The following examples are intended to be illustrative of the present invention and to teach one of ordinary skill in the art how to make and use the invention. These examples are not intended to limit the invention or its protection in any way.

Example 1

A fixturing adhesive was prepared by dissolving 30 grams of Pentalyn C rosin and 4 grams of polypropylene glycol in 66 grams of hexyl acetate.

A plastic bag was coated with the fixturing adhesive and dried in a vacuum oven for 30 to 60 seconds at a temperature of approximately 180° F. to 190° F. under 25 inches of vacuum. The plastic bag was cut and static tests were conducted on the samples at a charging current of 0.2 μa.

The static tests were conducted using a Stat-Tester® Model 169 which is available from Most Associates of Marblehead, Mass. This device is designed to simulate a capacitor with the test sample corresponding to the insulator part of the capacitor.

In the test procedure, two preformed one inch diameter plastic samples were cut with a stainless steel punch. The samples were placed in sample chambers preformed in an aluminum plate which is mounted for rotation. The samples are held in place using brass plugs. These brass plugs act as electrodes during the testing. A second set of brass electrodes are positioned within the tester, below the samples. The aluminum plate containing the test samples is then rotated so that the test samples are between the pairs of brass electrodes. A potential is applied to a wire placed near the rotating plate until a current of 0.2 µa is developed. The maximum voltage is then recorded at 0.2 µa and then the current switched off. The maximum voltage and rate of charge dissipation is a measure of the antistatic properties of the test sample. Good antistats have low initial voltages, because the fast charge dissipation will not allow a voltage to develop. Good antistats also have fast discharge times.

The initial time zero voltage at 0.2 µa was 860 volts and after a discharge time of 60 seconds, the final voltage after the removal of the current was 625 volts. This indicates that the fixturing adhesive film acts as an insulator because the charge is retained.

Example 2

The same procedure as described in Example 1 was followed, except that 5% oleyl imidazoline was used as the antistatic agent in place of some of the hexyl acetate solvent.

The initial time zero voltage at 0.2 µa was 280 volts and after a discharge time of less than 5 seconds, the voltage was reduced to zero. This indicates that the fixturing adhesive is effective in reducing static charge on adhesive films since it minimized the initial build-up of static charge and then dissipated the charge almost instantaneously.

While the invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

We claim:

1. An improved fixturing adhesive composition for producing fixturing adhesive films with reduced static charge comprising:
   (a) a solvent carrier having a boiling point no greater than 200° F. under a vacuum of 25 inches of mercury, wherein the solvent carrier is selected from the group consisting of aliphatic esters containing 4–8 carbon atoms;
   (b) a fixturing adhesive soluble in the solvent carrier, wherein the fixturing adhesive is a rosin-based material selected from the group consisting of pentaerythtitol ester of a hydrogenated wood rosin, and glycerol ester of a partially hydrogenated wood rosin; and
   (c) an antistatic agent.

2. The composition of claim 1 wherein the antistatic agent is selected from the group consisting of amine oxides, amides, quaternary amines, heterocyclic amines, imidazolines, oleyl imidazolines, and oleyl imidazoline salts.

3. The composition of claim 1 wherein the antistatic agent is selected from the group consisting of imidazoline, oleyl imidazoline, and oleyl imidazoline salts.

4. The composition of claim 2 including a plasticizer.

5. The composition of claim 1 wherein the solvent carrier is hexyl acetate.

6. The composition of claim 1 wherein the solvent carrier is ethyl acetate.

7. The composition of claim 2 including a plasticizer selected from the group consisting of polyethylene glycol, polypropylene glycol, and polyhydric compounds.

8. An improved fixturing adhesive composition for producing fixturing adhesive films with reduced static charge comprising:
   (a) a solvent carrier having a boiling point no greater than 200° F. under a vacuum of 25 inches of mercury;
   (b) a fixturing adhesive soluble in the solvent carrier; and
   (c) an antistatic agent selected from the group consisting of amine oxides, amides, quaternary amines, heterocyclic amines, imidazolines, oleyl imidazolines, and oleyl imidazoline salts.

9. An improved fixturing cement composition for attaching silicon wafers to a substrate prior to polishing, the composition comprising:
   (a) 20–60 weight percent of a solvent carrier selected from the group consisting of aliphatic esters containing 4–8 carbon atoms;
   (b) 20–60 weight percent of a fixturing adhesive composition soluble in the solvent carrier, wherein the fixturing adhesive is a rosin-based material selected from the group consisting of pentaerythtitol ester of a hydrogenated wood rosin, and glycerol ester of a partially hydrogenated wood rosin; and
   (c) 0.5–10 weight percent of an antistatic agent.

10. An improved fixturing cement composition for attaching silicon wafers to a substrate prior to polishing the composition comprising:
    (a) 20–60 weight percent of a solvent carrier;
    (b) 20–60 weight percent of a fixturing adhesive composition soluble in the solvent carrier; and
    (c) 0.5–10 weight percent of an antistatic agent selected from the group consisting of amine oxides, amides, quaternary amines, heterocyclic amines, imidazolines, oleyl imidazolines, and oleyl imidazoline salts.

11. The composition of claim 10 wherein the antistatic agent is selected from the group consisting of amine oxides, amides, quaternary amines, heterocyclic amines, imidazolines, oleyl imidazolines, and oleyl imidazoline salts.

12. The composition of claim 10 wherein the antistatic agent is selected from the group consisting of imidazoline, oleyl imidazoline, and oleyl imidazoline salts.

13. An improved fixturing cement composition for attaching silicon wafers to a substrate prior to polishing the composition comprising:
    (a) 20–60 weight percent of hexyl acetate as a solvent carrier;
    (b) 20–60 weight percent of a fixturing adhesive composition soluble in the solvent carrier; and
    (c) 0.5–10 weight percent of an antistatic agent.

14. The composition of claim 9 wherein the solvent carrier is ethyl acetate.

15. The composition of claim 12 including a plasticizer selected from the group consisting of polyethylene glycol, polypropylene glycol, and polyhydric compounds.

* * * * *